(12) United States Patent
Hruska et al.

(10) Patent No.: US 10,179,488 B2
(45) Date of Patent: Jan. 15, 2019

(54) DRAWBAR ASSEMBLY WITH PIN EJECTOR MECHANISM

(71) Applicant: AGCO Corporation, Hesston, KS (US)

(72) Inventors: Derek Hruska, Lime Springs, IA (US); Matthew Benjamin Shaw, Jackson, MN (US)

(73) Assignee: AGCO Corporation, Duluth, GA (US)

( * ) Notice: Subject to any disclaimer, the term of this patent is extended or adjusted under 35 U.S.C. 154(b) by 0 days.

(21) Appl. No.: 15/767,931

(22) PCT Filed: Oct. 25, 2016

(86) PCT No.: PCT/US2016/058616
§ 371 (c)(1),
(2) Date: Apr. 12, 2018

(87) PCT Pub. No.: WO2017/078971
PCT Pub. Date: May 11, 2017

(65) Prior Publication Data
US 2018/0304706 A1 Oct. 25, 2018

Related U.S. Application Data

(60) Provisional application No. 62/250,619, filed on Nov. 4, 2015.

(51) Int. Cl.
*B60D 1/02* (2006.01)
*B60D 1/28* (2006.01)
*B60D 1/48* (2006.01)

(52) U.S. Cl.
CPC ............... *B60D 1/025* (2013.01); *B60D 1/28* (2013.01); *B60D 1/48* (2013.01)

(58) Field of Classification Search
CPC ............. B60D 1/025; B60D 1/28; B60D 1/48
USPC ............................. 280/515; 403/322.4, 319
See application file for complete search history.

(56) References Cited

U.S. PATENT DOCUMENTS

| | | | | |
|---|---|---|---|---|
| 1,837,940 A | * | 12/1931 | Ade ........................ | B60D 1/02 280/508 |
| 1,939,463 A | * | 12/1933 | Rockinger, Jr. ......... | B60D 1/02 280/508 |
| 2,048,310 A | * | 7/1936 | Wohldorf ................. | B60D 1/02 280/477 |

(Continued)

FOREIGN PATENT DOCUMENTS

CN     204451867 U     7/2015

OTHER PUBLICATIONS

UK Intellectual Property Office, International Search Report for related UK Application No. GB1520895.2, dated May 10, 2016.

(Continued)

*Primary Examiner* — Joseph M Rocca
*Assistant Examiner* — Conan D Duda (57) ABSTRACT

A drawbar assembly for coupling a drawbar to a tongue of a towed implement includes a drawbar pin and a drawbar clevis having a bore configured to receive the drawbar pin. A locking plate is coupled to the drawbar clevis and movable between a pin-locked position in which the locking plate is configured to obstruct at least a portion of the bore, and a pin-unlock condition. An ejector mechanism is configured to dislodge the drawbar pin from the bore.

8 Claims, 8 Drawing Sheets

(56) References Cited

U.S. PATENT DOCUMENTS

| | | | | |
|---|---|---|---|---|
| 2,077,825 A * | 4/1937 | Davidson | ................ | B60D 1/02 278/96 |
| 2,478,736 A * | 8/1949 | Balzen | ................ | B60D 1/02 280/477 |
| 2,827,317 A * | 3/1958 | Saulnier | ................ | B60D 1/02 403/157 |
| 2,845,281 A * | 7/1958 | Green | ................ | B60D 1/02 280/479.3 |
| 3,998,472 A * | 12/1976 | Tretter | ................ | B60D 1/02 280/515 |
| 4,147,374 A * | 4/1979 | Jeffes | ................ | B60D 1/04 280/478.1 |
| 4,447,071 A * | 5/1984 | Kaplan | ................ | B60D 1/02 280/479.1 |
| 4,526,396 A * | 7/1985 | Mayer | ................ | B60D 1/025 280/515 |
| 4,579,364 A * | 4/1986 | Kranz | ................ | B60D 1/28 280/507 |
| 5,427,399 A * | 6/1995 | Olson | ................ | A01B 59/042 280/508 |
| 6,004,064 A * | 12/1999 | Franz | ................ | B62K 25/02 301/124.2 |
| 6,145,866 A * | 11/2000 | Peter | ................ | B60D 1/02 280/515 |
| 6,880,368 B1 * | 4/2005 | Ulbrich | ................ | B60D 1/06 280/425.2 |
| 7,926,832 B1 | 4/2011 | Hall | | |
| 8,079,613 B2 * | 12/2011 | Williams | ................ | B60D 1/52 280/491.5 |
| 9,004,557 B2 | 4/2015 | Knox | ................ | B66C 1/36 294/82.11 |
| 2002/0003341 A1 * | 1/2002 | Hall | ................ | B60D 1/065 280/423.1 |
| 2003/0090084 A1 * | 5/2003 | Goby | ................ | B60D 1/00 280/493 |
| 2003/0193167 A1 * | 10/2003 | Hall | ................ | B60D 1/065 280/508 |
| 2004/0119263 A1 | 6/2004 | Kollath | | |
| 2004/0232655 A1 * | 11/2004 | Heitlinger | ................ | B60D 1/02 280/515 |
| 2007/0145719 A1 * | 6/2007 | Heitlinger | ................ | B60D 1/02 280/507 |
| 2007/0290484 A1 * | 12/2007 | Buerkle | ................ | B60D 1/02 280/515 |
| 2008/0067785 A1 * | 3/2008 | Buerkle | ................ | B60D 1/02 280/515 |
| 2008/0100034 A1 * | 5/2008 | Maillet | ................ | B60D 1/02 280/515 |
| 2009/0058042 A1 | 3/2009 | Tveito et al. | | |
| 2010/0244407 A1 * | 9/2010 | Hsai | ................ | B60D 1/025 280/507 |
| 2011/0049840 A1 * | 3/2011 | Shaw | ................ | B60D 1/02 280/515 |
| 2012/0299271 A1 * | 11/2012 | Terpsma | ................ | B60D 1/02 280/515 |
| 2013/0033021 A1 | 2/2013 | Prescott et al. | | |
| 2013/0154236 A1 | 6/2013 | Shaw et al. | | |
| 2013/0221635 A1 * | 8/2013 | Terpsma | ................ | B60D 1/025 280/515 |
| 2013/0334794 A1 * | 12/2013 | Raider | ................ | B60D 1/02 280/515 |
| 2015/0054259 A1 * | 2/2015 | Smith | ................ | B60D 1/30 280/515 |
| 2015/0093078 A1 * | 4/2015 | Yu | ................ | G02B 6/4284 385/77 |
| 2015/0157118 A1 * | 6/2015 | Tseng | ................ | A45F 5/02 403/322.4 |
| 2015/0314386 A1 * | 11/2015 | Miller | ................ | B25B 5/04 403/322.4 |
| 2017/0120705 A1 * | 5/2017 | Hruska | ................ | B60D 1/025 |

OTHER PUBLICATIONS

European Patent Office, International Search Report for International Application No. PCT/US2016/058616, dated Jan. 20, 2017.

\* cited by examiner

DRAWBAR ASSEMBLY WITH PIN EJECTOR MECHANISM

CROSS REFERENCE TO RELATED APPLICATION

This application claims the benefit of U.S. Provisional Application No. 62/250,619 filed Nov. 4, 2015, which is hereby incorporated by reference in its entirety.

BACKGROUND OF THE INVENTION

Field of Invention

The present invention relates generally to drawbars for coupling an implement to a vehicle, and more particularly, to drawbar pin ejector devices.

Description of Related Art

Drawbars are commonly used to couple implements to agricultural vehicles, such as tractors. For example, a drawbar may have a clevis arranged to receive a tongue of an implement to be towed. The clevis and tongue may have bores through which a drawbar pin is inserted to couple the drawbar and tongue together.

While attaching and detaching drawbar pulled implements to a tractor, the drawbar pin may become stuck and be difficult to pull out from its housing. It would be desirable to have a drawbar coupling system that partially ejects the drawbar pin from the clevis to allow it to be removed more easily from the clevis.

OVERVIEW OF THE INVENTION

In one aspect, the invention is directed to a drawbar assembly for coupling a drawbar to a tongue of a towed implement. The drawbar assembly includes a drawbar having a drawbar bore, a drawbar clevis having a clevis bore, and a drawbar pin, the drawbar pin configured to be received in the drawbar and clevis bores to couple a towed implement to the drawbar. The drawbar assembly has a locking plate movably coupled to the drawbar clevis, the locking plate being movable between a pin-locked position where the locking plate is configured to obstruct at least a portion of the bore, and a pin-unlocked position, wherein the locking plate contains at least one locking plate groove formed therein. The drawbar assembly has an upper retaining plate mounted above the locking plate coupling the locking plate to the clevis, wherein the upper retaining plate contains at least one retaining plate groove formed therein. The drawbar assembly has a latching device mounted on the retaining plate with a pivot mechanism, the latching device being pivotably moveable between a locking position and a release position, the latching device comprising at least one catch aligned to be received in the retaining plate groove when the latching device is in the locking position, wherein when the locking plate is moved from the pin-locked position to the pin-unlocked position, the locking plate groove aligns with the retaining plate groove so that the at least one catch is received in the locking plate groove as well as the retaining plate groove.

The drawbar assembly has an ejector mechanism configured to dislodge the drawbar pin from the drawbar and clevis bores, the ejector mechanism comprising a handle coupled to the drawbar pin and utilized to operate the ejector mechanism, the handle having an operating condition comprising first and second stages defined by a rotational position of the drawbar pin within the clevis bore, wherein the handle has an angled lever arm with a first arm segment and a second arm segment joined to the first arm segment with an elbow, wherein with the handle in the first stage, the lever arm is pivoted so that the first arm segment contacts a first support such that the first support acts as a fulcrum for the lever arm and as the drawbar pin is urged out of the bores, a contact point between the lever arm and the first support shifts from the first arm segment, through the elbow and then to the second arm segment, and with the handle in the second stage the lever arm is pivoted so that the lever arm contacts a second support, the second support acting as a fulcrum for the lever arm, the second support having an elevation height relative the drawbar that is different than the elevation height of the first support such that the drawbar pin is urged further out of the bores.

These and other features and advantages of this invention are described in, or are apparent from, the following detailed description of various exemplary embodiments of the systems and methods according to this invention.

BRIEF DESCRIPTION OF THE DRAWINGS

The above mentioned and other features of this invention will become more apparent and the invention itself will be better understood by reference to the following description of embodiments of the invention taken in conjunction with the accompanying drawings, wherein.

Corresponding reference characters indicate corresponding parts throughout the views of the drawings.

DETAILED DESCRIPTION OF EXEMPLARY EMBODIMENTS

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

Figure 1:
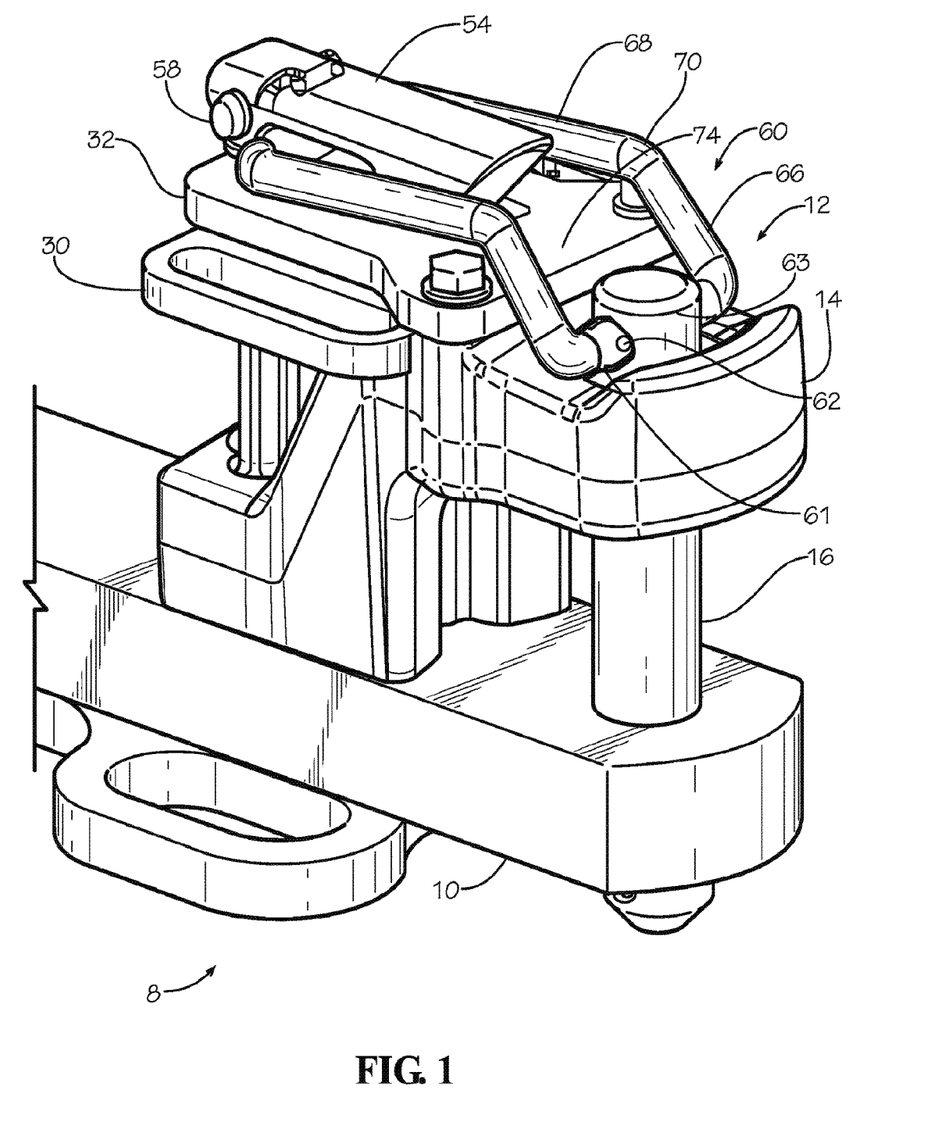
FIG. 1 shows a perspective view of a drawbar assembly with a drawbar pin ejection mechanism according to one embodiment of the invention.
Figure 3:
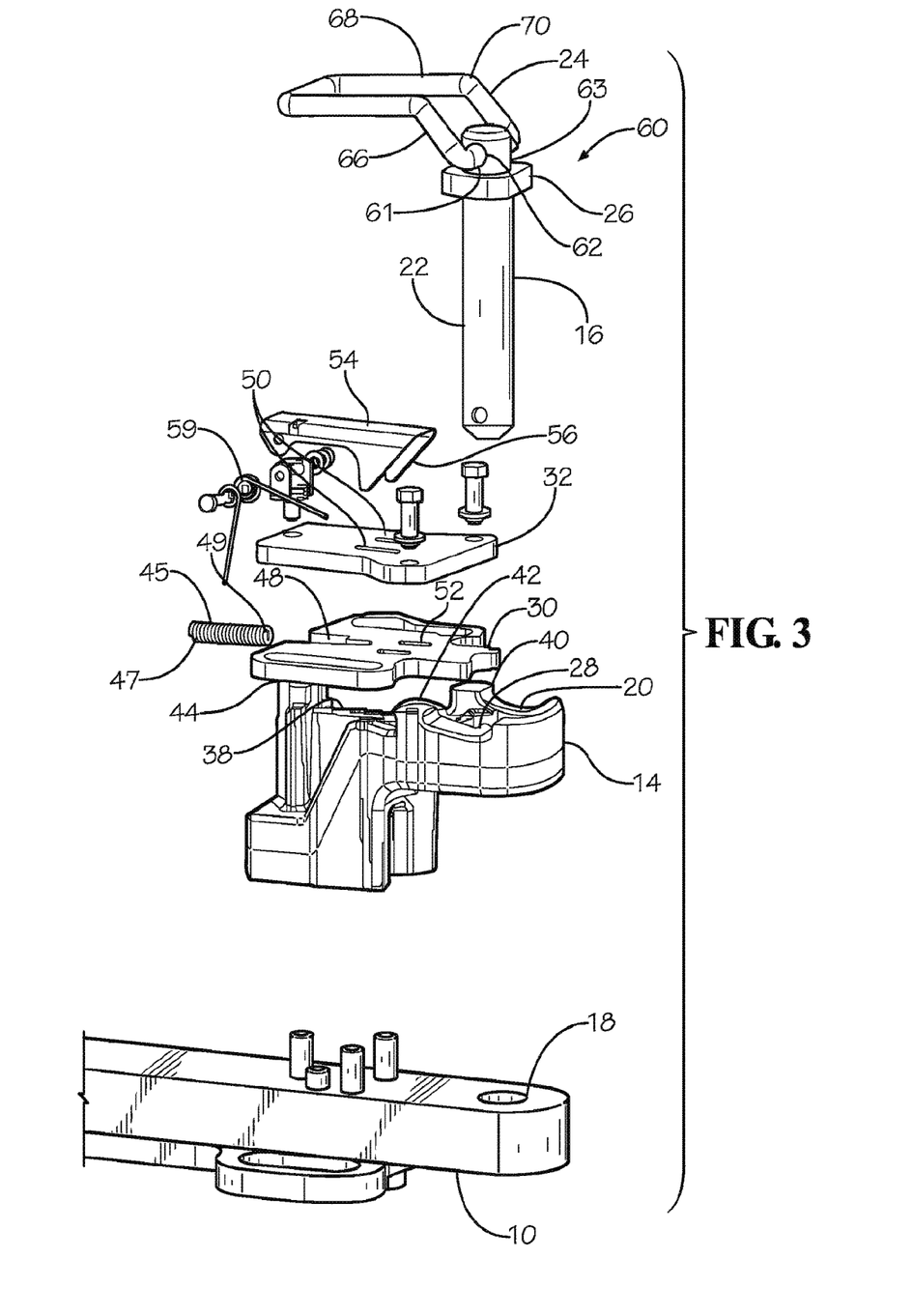
FIG. 3 shows an exploded view of the drawbar assembly of FIG. 1.

Turning to the figures wherein like numbers represent like elements throughout the several views, FIG. 1 shows a drawbar assembly 8 including a drawbar 10 and a drawbar pin retention device 12. The drawbar 10 may have a clevis 14 configured to receive a drawbar pin 16. As best seen in the exploded view of FIG. 3, the drawbar 10 and clevis 14 each have a bore 18, 20 respectively through which the drawbar pin 16 may be inserted. The clevis 14 receives a tongue (not shown) of an implement. The tongue includes a bore configured for alignment with the bores 18, 20 so that when the tongue is inserted into the clevis 14, the drawbar pin 16 extends through the clevis 14, the tongue, and the drawbar 10, thereby coupling the tongue to the drawbar 10.

The drawbar pin 16 comprises a generally cylindrically shaped member 22 having a handle 24 at an upper end and a shoulder 26. The bore 20 may include a shoulder recess 28 for receiving the shoulder 26 of the drawbar pin 16. Contact between the shoulder 26 of the drawbar pin 16 with the clevis 14 prevents the drawbar pin 16 from falling through the bore 20.

Figure 4:
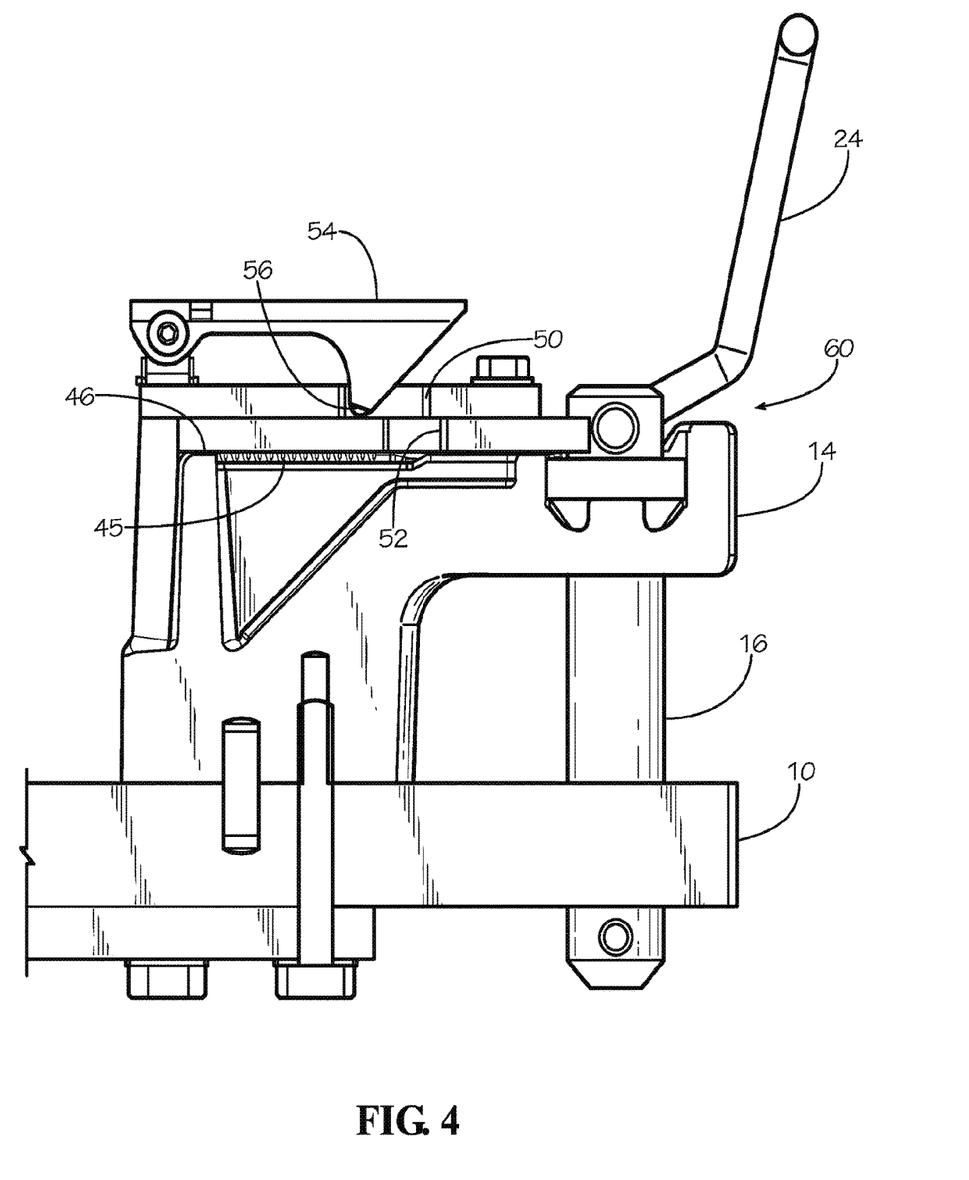
FIG. 4 is a sectional view of the drawbar assembly of FIG. 1 with a locking plate in a pin-unlock position and the ejector arm in a home position.
Figure 5:
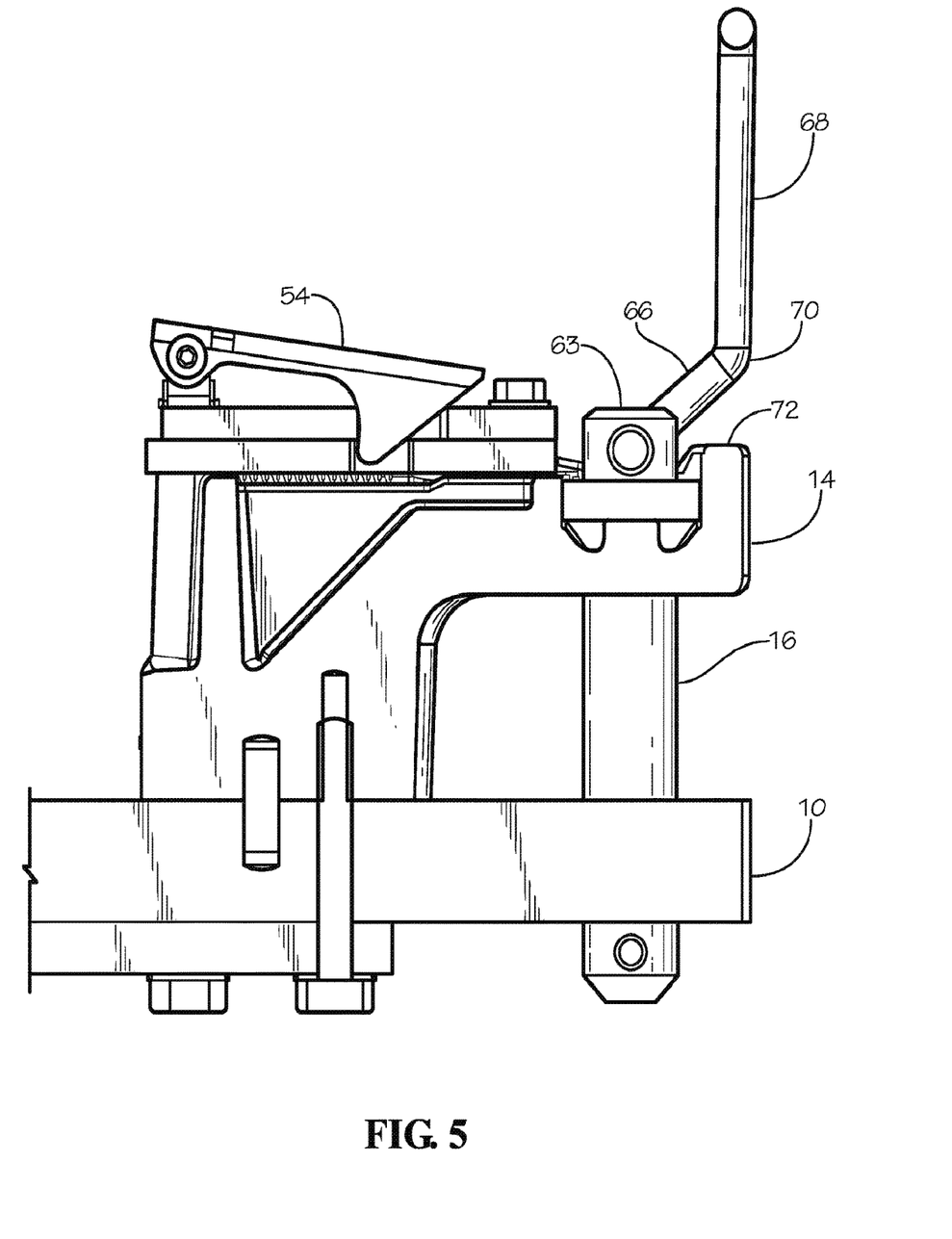
FIG. 5 is a sectional view of the drawbar assembly of FIG. 1 with the ejector arm moving to an eject position.

The drawbar pin retention device 12 contains a locking plate 30 that is movably coupled to the clevis 14 and configured to move between a pin-locked position (FIGS. 1 and 4) and a pin-unlock condition (FIG. 5). In an example embodiment, the locking plate 30 may be movable between the pin-locked position in which the locking plate 30 covers a sufficient portion of the drawbar bore 20 to prevent removal of a drawbar pin 16 within the bore 20 (or insertion of the drawbar pin 16 into the bore 20) and the pin-unlock condition in which the locking plate 30 is positioned to allow removal of the drawbar pin 16 from the bore 20 (or insertion into the bore 20). An upper retaining plate 32 is mounted above the locking plate 30 coupling the locking plate 30 to the clevis 14 and assisting in preventing debris from affecting the locking plate 30. The locking plate 30 may be provided with one or more handles 34 to assist a user in grasping the locking plate 30 and moving the locking plate 30 from the pin-locked position in which the bore 20 is at least partially covered to pin-unlock condition in which the bore 20 is uncovered. The handles 34 may extend out beyond the upper retaining plate 32 and the clevis 14 to allow for easy grasping by an operator.

The drawbar clevis 14 may be arranged to accommodate and facilitate movement of the locking plate 30. For example, the clevis 14 may be configured to have a generally flat surface 38 upon which the locking plate 30 rests and an arrangement of raised mounts 40, 42, 44 that provide a path through which the locking plate 30 moves and limits movement of the locking plate 30. The mounts 40, 42, 44 may extend a height above the flat surface 38 such that there is sufficient space between the upper retaining plate 32 and the flat surface 38 to allow for the movement of the locking plate 30.

In an example embodiment, the locking plate 30 is arranged as a spring-loaded mechanism in which a spring 45 urges the locking plate 30 to the pin-locked position such that the locking plate 30 is biased to the pin-locked position. The spring 45 may be positioned between the clevis 14 and the locking plate 30 so as to urge the locking plate 30 over the bore 20 to the pin-locked position. In one example embodiment, the drawbar clevis 14 may have a stop 46 for engaging a first end 47 of the spring 45. For example, the stop 46 is a raised portion that serves as a push wall against which the first end 47 of the spring 45 pushes. The locking plate 30 may have a recess 48 for receiving a second end 49 of the spring 45. In this arrangement, the spring 45 pushes the locking plate 30 toward the bore 20. Thus, the spring 45 pushes the locking plate 30 to the pin-locked position, in which the locking plate 30 is positioned over a portion of the bore 20 to cover the shoulder 26 of the drawbar pin 16 within the shoulder recess 28.

Desirably, the locking plate 30 must be manually slid back into its pin-unlocked position. In one embodiment, the upper retaining plate 32 contains at least one retaining plate groove 50 formed therein and the locking plate 30 contains at least one locking plate groove 52 formed therein. A latching device 54 has at least one catch 56 aligned to be received in the retaining plate groove 50. The latching device 54 is pivotably mounted on the retaining plate 32 with pivot mechanism 58. When the locking plate 30 is moved to the pin-unlocked position as shown in FIG. 5 from the pin-locked position as shown in FIG. 4, the locking plate groove 52 aligns with the retaining plate groove 50 so that the catch 56 can be received in the locking plate groove 52 as well as the retaining plate groove 50. Desirably, a torsion spring 59 biases the latching device 54 into a locking position such that the catch 56 is forced into the retaining plate groove 50 and locking plate groove 52. With the locking plate positioned to the pin-unlocked position and the catch 56 received in the aligned retaining plate and locking plate grooves 50, 52, the operator may release the locking plate 30 and the force of the spring 45 pushing the locking plate 30 against the catch 56 causes the catch 56 to hold the locking plate 30 in the pin-unlock position.

Figure 2:
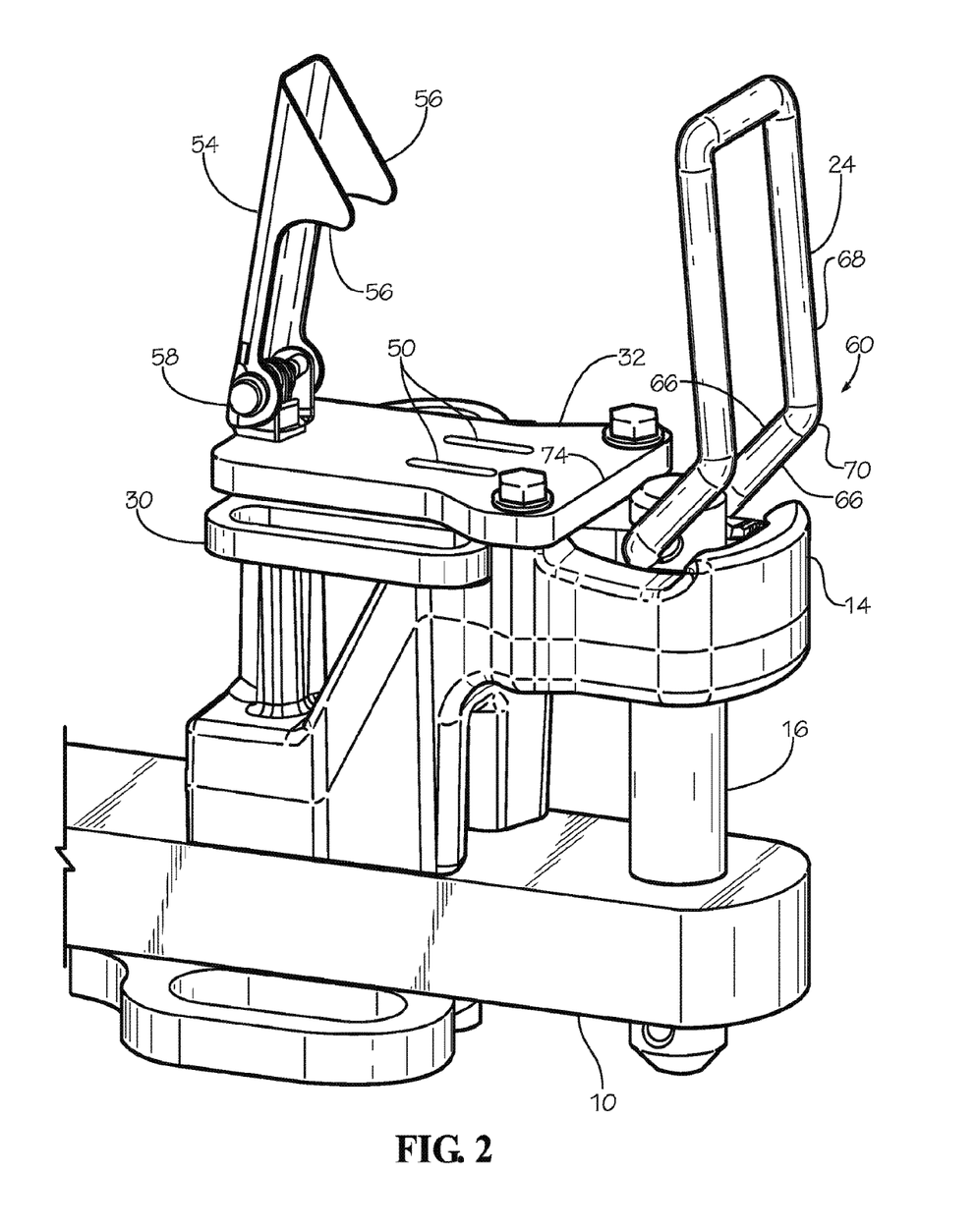
FIG. 2 shows another perspective view of the drawbar assembly of FIG. 1.

The drawbar assembly 8 has an ejector mechanism 60 comprising the handle 24 of the drawbar pin 16 that is used to help dislodge the drawbar pin 16 from the bores 18, 20. In one embodiment, the handle 24 comprises a handle shaft 61 that is received in a bore 62 through a head 63 of the drawbar pin 16 such that the handle 24 is pivotably mounted on the drawbar pin 16. In FIG. 1, the handle 24 is shown pivoted to a stowage condition where the handle 24 folds adjacent the retaining plate 32 such that when the latching device 54 is in the locked position, the latching device 54 covers the handle 24 and locks the handle 24 in its stowage condition adjacent the upper retaining plate 32. FIG. 2 shows the latching device 54 moved to a release position against the biasing force of the torsion spring 59. With the latching device 54 in the release position, the handle 24 may be moved from the stowage condition to an operating condition in which the handle 24 is not locked by the latching device 54. After the handle 24 is moved to the operating condition, the latching device 54 may be returned, biased by the torsion spring 59, so that it engages the retaining plate 32 in the locked position. With the handle 24 in the operating condition, the handle 24 may be used to at least partially eject the drawbar pin 16 from the bores 18, 20 as will be explained below.

Figure 6:
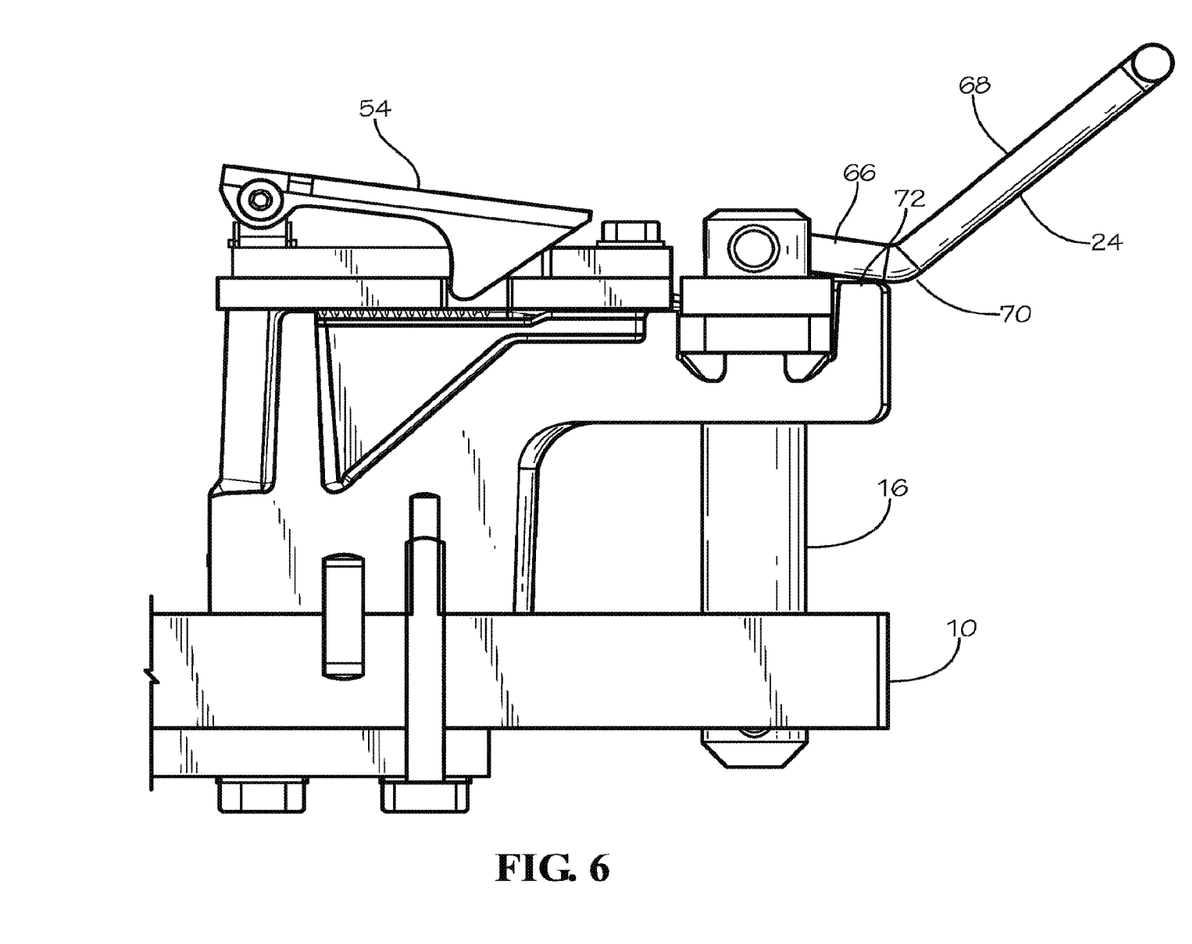
FIG. 6 is a sectional view of the drawbar assembly of FIG. 1 with the ejector arm in the eject position.
Figure 7:
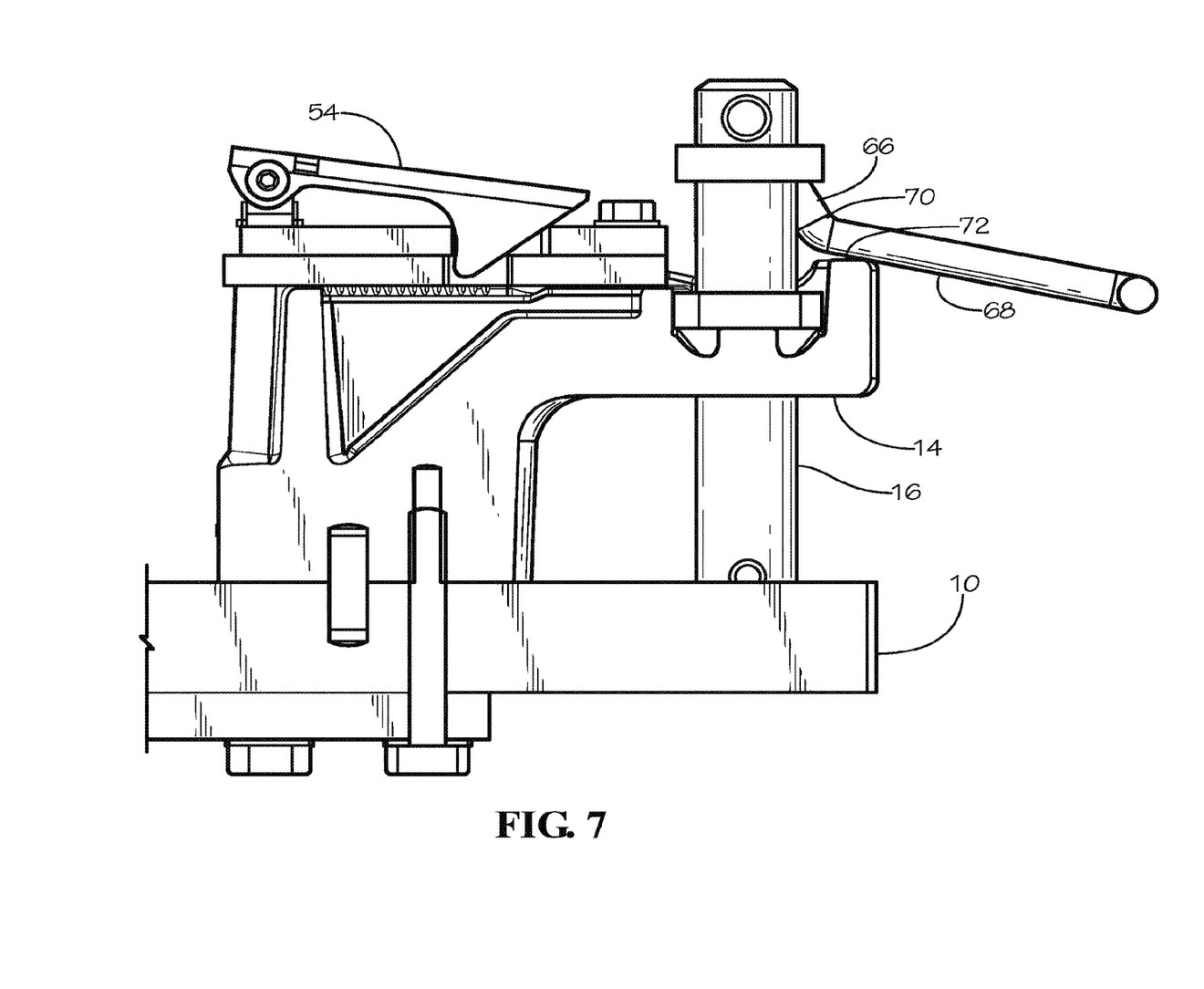
FIG. 7 is a sectional view of the drawbar assembly of FIG. 1 with a locking plate in a pin-unlock position and the ejector arm in a home position.

The handle 24 has an angled lever arm 64 with a first arm segment 66 and a second arm segment 68 joined to the first arm segment 66 with elbow 70 such that the first and second arm segments 66, 68 do not form a straight line. The operating condition of the handle 24 has first and second stages or positions defined by the rotational position of the drawbar pin 16 within the bore 20 relative the clevis 14. With the handle 24 in the first stage, the lever arm 64 is pivoted so that the first arm segment 66 contacts a first support 72 as shown in FIG. 6. In the illustrated embodiment, the first support 72 is a first ledge on the clevis 14 partially surrounding the bore 20. As the lever arm 64 is pivoted, the first support 72 acts as a fulcrum for the lever arm 64 and the drawbar pin 16 is urged out of the bores 18, 20. Further pivoting of the lever arm 64 causes the head 63 of the drawbar pin 18 to raise in relation to the first support 72 such that a contact point between the lever arm 64 and the first support 72 shifts from the first arm segment 66 of the lever arm 64, through the elbow 70 and then to the second arm segment 68 as shown in FIG. 7. Desirably, the lever arm 64 is pivoted until the drawbar pin 18 is ejected the maximum amount provided by the configuration of the lever arm 64 and first support 72 provided by the first stage.

Figure 8:
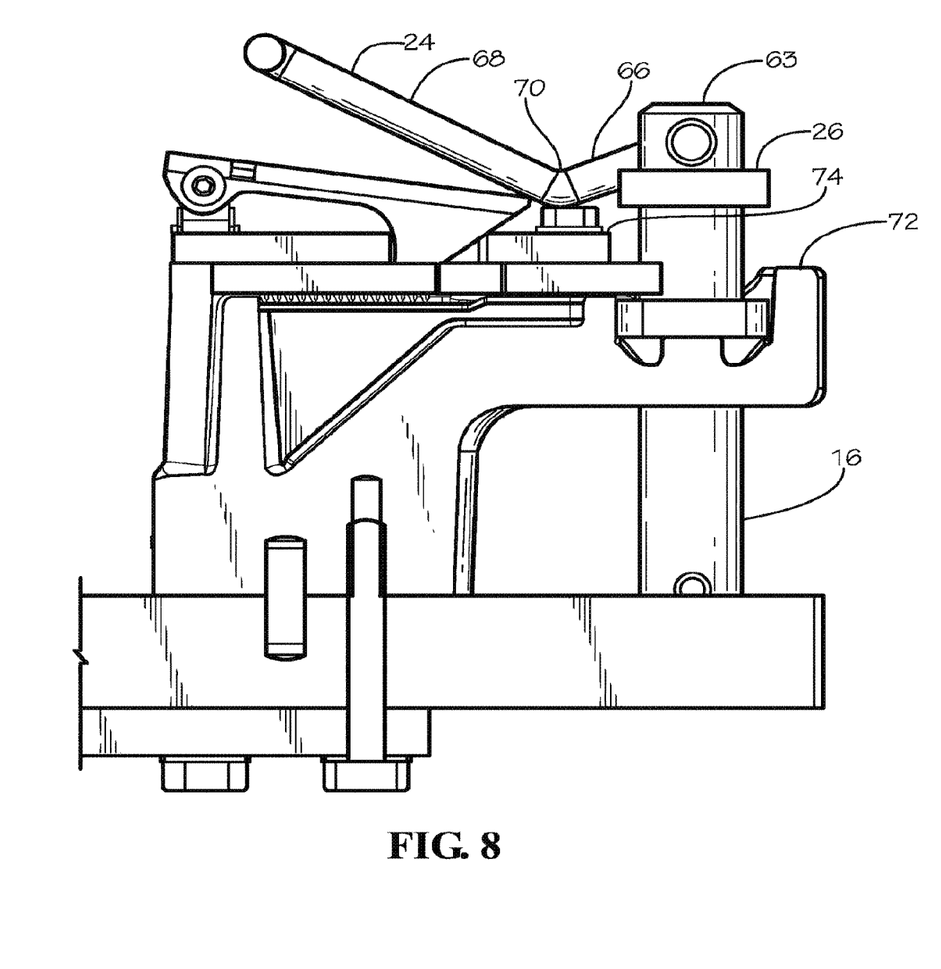
FIG. 8 is a sectional view of the drawbar assembly of FIG. 1 with the ejector arm in the eject position.

The drawbar pin 16 is then rotated within the bore 20 relative the clevis 14 such that the handle 24 is shifted from the first stage to the second stage as shown in FIG. 8. With the drawbar pin 16 in the second stage, the lever arm 64 is pivoted so that the lever arm 64 contacts a second support 74. According to the invention, the second support 74 has an elevation height relative the drawbar 10 that is different than the elevation height of the first support 72 relative the drawbar 10. In the illustrated embodiment, the drawbar pin 16 in the second stage is rotated in the bore 20 about 180 degrees relative the clevis 14 from its position within the bore 20 in the first stage, and the second support 74 is a portion of the retaining plate 32. However, one skilled in the art will understand that the rotational position of the drawbar pin 16 in the second stage can be different than 180 degrees relative the rotational position in the first stage, and that the second support 74 can be any support surface adjacent the drawbar pin 16, such as an additional ledge on the clevis 14 or other component that has an elevation height relative the drawbar 10 that is different than the elevation height of the surface of the first support 72. With the lever arm 64 in the second stage, the second support 74 acts as a fulcrum for the lever arm 64, and the drawbar pin 16 is urged further out of the bores 18, 20, thereby causing the head of the drawbar pin 16 to be raised in relation to the second support 74. Desirably, as the drawbar pin 16 is urged out of the bores 18, 20 in the second stage, the contact between the lever arm 64 and the second support 74 shifts from the first arm segment 66, through the elbow 70 and to the second arm segment 68. Desirably, when the lever arm 64 is pivoted until the drawbar pin 18 is ejected the maximum amount provided by the configuration of the lever arm 54 and the second support 74, the drawbar pin 16 is substantially clear of the bore 18 in drawbar 10.

Various examples have been set forth herein to provide an understanding of the invention, but the invention is not limited to the example embodiments and additional embodiments will occur to those skilled in the art. Although the invention has been discussed with respect to specific embodiments, thereof, the embodiments are merely illustrative, not restrictive of the invention. Numerous specific details are provided, such as examples of components and methods, to provide a thorough understanding of the invention. One skilled in the relevant art will recognize, however, that an embodiment of the invention can be practiced without one or more of the specific details, or with other apparatus, systems, methods, components and/or the like.

What is claimed is:

1. A drawbar assembly for coupling a drawbar to a tongue of a towed implement, the drawbar assembly comprising:
   a drawbar having a drawbar bore;
   a drawbar clevis having a clevis bore;
   a drawbar pin, the drawbar pin configured to be received in the drawbar bore and clevis bore so as to couple a towed implement to the drawbar;
   a locking plate movably coupled to the drawbar clevis, the locking plate being movable between a pin-locked position where the locking plate is configured to obstruct at least a portion of the drawbar bore, and a pin-unlocked position, wherein the locking plate contains at least one locking plate groove formed therein;
   an upper retaining plate mounted above the locking plate and coupling the locking plate to the clevis, wherein the upper retaining plate contains at least one retaining plate groove formed therein;
   a latching device mounted on the retaining plate with a pivot mechanism, the latching device being pivotably moveable between a locking position and a release position, the latching device comprising at least one catch aligned to be received in the retaining plate groove when the latching device is in the locking position, wherein when the locking plate is moved from the pin-locked position to the pin-unlocked position, the locking plate groove aligns with the retaining plate groove so that the at least one catch is received in the locking plate groove as well as the retaining plate groove; and
   an ejector mechanism configured to dislodge the drawbar pin from the drawbar and clevis bores, the ejector mechanism comprising a handle coupled to the drawbar pin and utilized to operate the ejector mechanism, the handle having an operating condition comprising first and second stages defined by a rotational position of the drawbar pin within the clevis bore, wherein the handle has an angled lever arm with a first arm segment and a second arm segment joined to the first arm segment with an elbow, wherein with the handle in the first stage, the lever arm is pivoted so that the first arm segment contacts a first support such that the first support acts as a fulcrum for the lever arm and as the drawbar pin is urged out of the bores, a contact point between the lever arm and the first support shifts from the first arm segment, through the elbow and then to the second arm segment, and with the handle in the second stage the lever arm is pivoted so that the lever arm contacts a second support, the second support acting as a fulcrum for the lever arm, the second support having an elevation height relative the drawbar that is different than the elevation height of the first support such that the drawbar pin is urged further out of the bores.

2. The drawbar assembly of claim 1 wherein the handle comprises a handle shaft that is received in a bore through a head of the drawbar pin such that the handle is pivotably mounted on the drawbar pin.

3. The drawbar assembly of claim 1 wherein when the handle is pivoted to a stowage condition where the handle folds adjacent the retaining plate such that when the latching device is in the locked position, the latching device covers the handle and locks the handle in its stowage condition adjacent the upper retaining plate, and when the latching device is moved to a release position, the handle may be moved from the stowage condition to an operating condition in which the handle is not locked by the latching device.

4. The drawbar assembly of claim 1 wherein the first support is a first ledge on the clevis partially surrounding the clevis bore.

5. The drawbar assembly of claim 1 wherein the drawbar pin in the second stage is rotated in the clevis bore about 180 degrees relative the clevis from its position within the clevis bore in the first stage.

6. The drawbar assembly of claim 1 wherein the second support is a portion of the retaining plate.

7. The drawbar assembly of claim 1 wherein as the drawbar pin is urged out of the bores in the second stage, the contact between the lever arm and the second support shifts from the first arm segment, through the elbow and to the second arm segment.

8. The drawbar assembly of claim 1 wherein when the lever arm is pivoted until the drawbar pin is ejected the maximum amount provided by the configuration of the lever arm and the second support, the drawbar pin is clear of the drawbar bore.

\* \* \* \* \*